(12) United States Patent
Dorius et al.

(10) Patent No.: US 7,751,147 B2
(45) Date of Patent: Jul. 6, 2010

(54) AIR BEARING SURFACE WITH SHALLOW CENTER CHANNEL

(75) Inventors: Lee K. Dorius, San Jose, CA (US); Weidong Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 699 days.

(21) Appl. No.: 11/329,590

(22) Filed: Jan. 10, 2006

(65) Prior Publication Data

US 2007/0159724 A1 Jul. 12, 2007

(51) Int. Cl.
*G11B 5/60* (2006.01)

(52) U.S. Cl. .................... 360/235.8; 360/236

(58) Field of Classification Search .... 360/235.5–236.3
See application file for complete search history.

(56) References Cited

U.S. PATENT DOCUMENTS

| | | | | |
|---|---|---|---|---|
| 5,587,858 A | * | 12/1996 | Dorius et al. | 360/236.3 |
| 6,055,130 A | * | 4/2000 | Dorius et al. | 360/236.3 |
| 6,493,188 B1 | * | 12/2002 | Tokisue et al. | 360/245.1 |
| 6,560,071 B2 | * | 5/2003 | Chapin et al. | 360/235.7 |
| 6,809,904 B2 | * | 10/2004 | Boutaghou et al. | 360/235.8 |
| 7,154,709 B2 | * | 12/2006 | Rao et al. | 360/235.8 |
| 7,262,937 B2 | * | 8/2007 | Pendray et al. | 360/235.1 |
| 2002/0109941 A1 | * | 8/2002 | Chapin et al. | 360/235.7 |
| 2003/0058578 A1 | * | 3/2003 | Boutaghou et al. | 360/235.8 |
| 2003/0067719 A1 | * | 4/2003 | Boutaghou et al. | 360/236.2 |
| 2004/0027724 A1 | * | 2/2004 | Pendray et al. | 360/236.3 |
| 2004/0150916 A1 | * | 8/2004 | Rao et al. | 360/235.8 |
| 2004/0264053 A1 | * | 12/2004 | Pendray et al. | 360/236.3 |
| 2006/0114611 A1 | * | 6/2006 | Zhu et al. | 360/235.7 |

* cited by examiner

*Primary Examiner*—William J Klimowicz

(57) ABSTRACT

An air bearing surface (ABS) for a head assembly for a data storage device is described. The ABS includes a member, comprising a first extended region and a second extended region, wherein these two regions define a channel. This channel is open to the leading edge (LE) of the ABS, and is configured so as to allow air to flow along the channel toward the trailing edge (TE) of the ABS. As a result, the pressure of the air flowing along the channel does not experience significant fluctuations in pressure until approaching the trailing edge.

13 Claims, 6 Drawing Sheets

AIR BEARING SURFACE WITH SHALLOW CENTER CHANNEL

BACKGROUND

1. Technical Field

The present invention relates generally to head assemblies used in data storage devices, and more particularly to the air bearing surface on the slider affixed to the transducer suspension system.

2. Related Art

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

This continual reduction in size has placed steadily increasing demands on the technology used in the HGA, particularly in terms of power consumption, shock performance, and disk real estate utilization. One recent advance in technology has been the development of the Femto slider, which is roughly one-third of the size and mass of the older Pico slider, which it replaces; over the past 23 years, slider size has been reduced by a factor of five, and mass by a factor of nearly 100.

These smaller sliders have substantially smaller surface areas, which increases the difficulties associated with achieving and maintaining a suitable fly height. Additionally, several of the applications for Femto sliders call for smaller disks, to better fit in portable electronic devices, and lower rotational speeds, to better conserve power. Coupled with concerns for temperature and ambient pressure insensitivity, so that drives using Femto sliders can be used in uncontrolled environmental conditions and at differing altitudes, it has proven very difficult to find an appropriate design for the air bearing surface of a slider that sufficiently meets the needs imposed by current demand.

SUMMARY

An air bearing surface (ABS) for a head assembly for a data storage device is described. The ABS includes a member, comprising a first extended region and a second extended region, wherein these two regions define a channel. This channel is open to the leading edge (LE) of the ABS, and is configured so as to allow air to flow along the channel toward the trailing edge (TE) of the ABS. As a result, the pressure of the air flowing along the channel does not experience significant fluctuations in pressure until approaching the trailing edge.

DETAILED DESCRIPTION

A head assembly and a data recording device configured to use a head assembly are disclosed. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a through understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
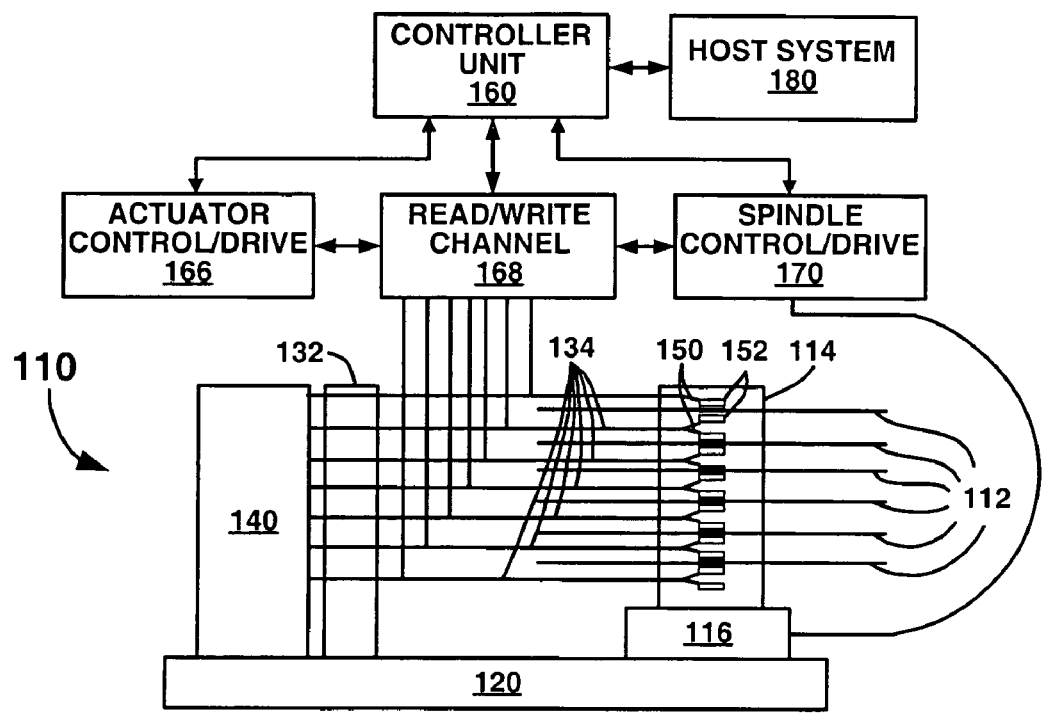
FIG. 1 is a side view of a hard disk drive and a controller unit in block form, in accordance with one embodiment of the present invention.
Figure 2:
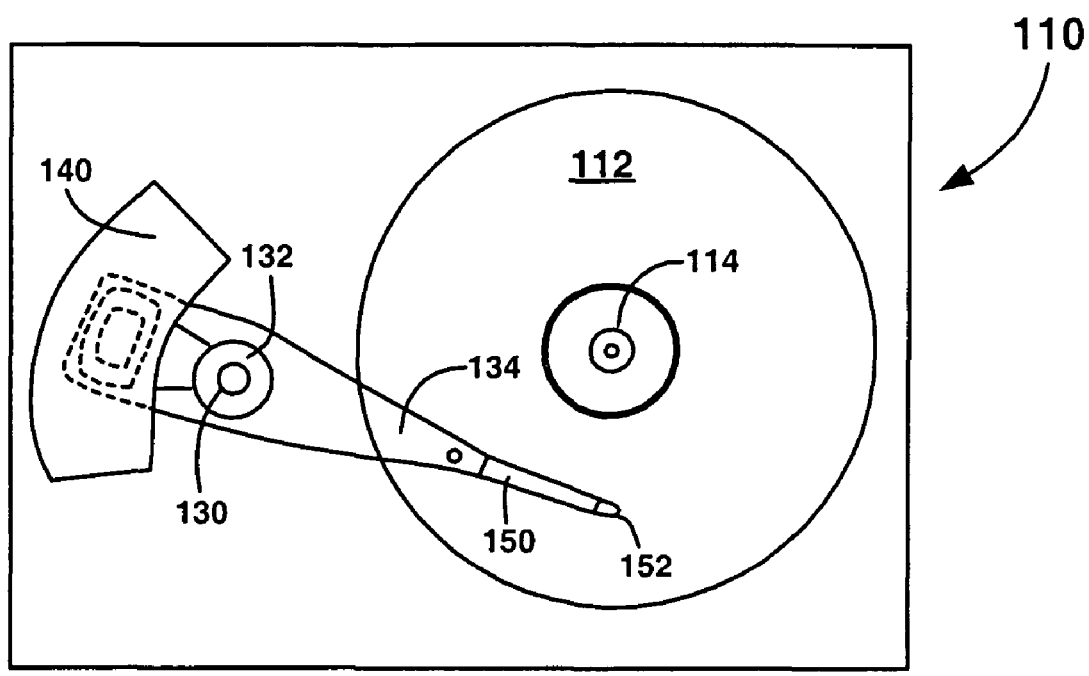
FIG. 2 is a top view of a hard disk drive system, in accordance with one embodiment of the present invention.

With reference now to FIGS. 1 and 2, a side and top view of a hard disk drive 110 is shown. Drive 110 has a disk pack having at least one media or magnetic disk 112, mounted to a spindle 114. A spindle motor 116 rotates the spindle 114 and the disk or disks 112. The spindle motor 114 and an actuator shaft 130 are attached to the chassis 120. A hub assembly 132 rotates about the actuator shaft 130 and supports a plurality of actuator arms 134, referred to as a "comb." A rotary voice coil motor 140 is attached to the chassis 120 and to a rear portion of the actuator arms 134.

A plurality of suspension assemblies 150 are attached to the actuator arms 134. A plurality of transducer heads or sliders 152 are attached respectively to the suspension assemblies 150. The sliders 152 are located proximate to the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller 160 is connected to an actuator control/drive unit 166 that in turn is connected to the rotary voice coil motor 140. This configuration allows controller 160 to control rotation of the disks 112. A host system 180, typically a computer system, is connected to the controller system 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Figure 3:
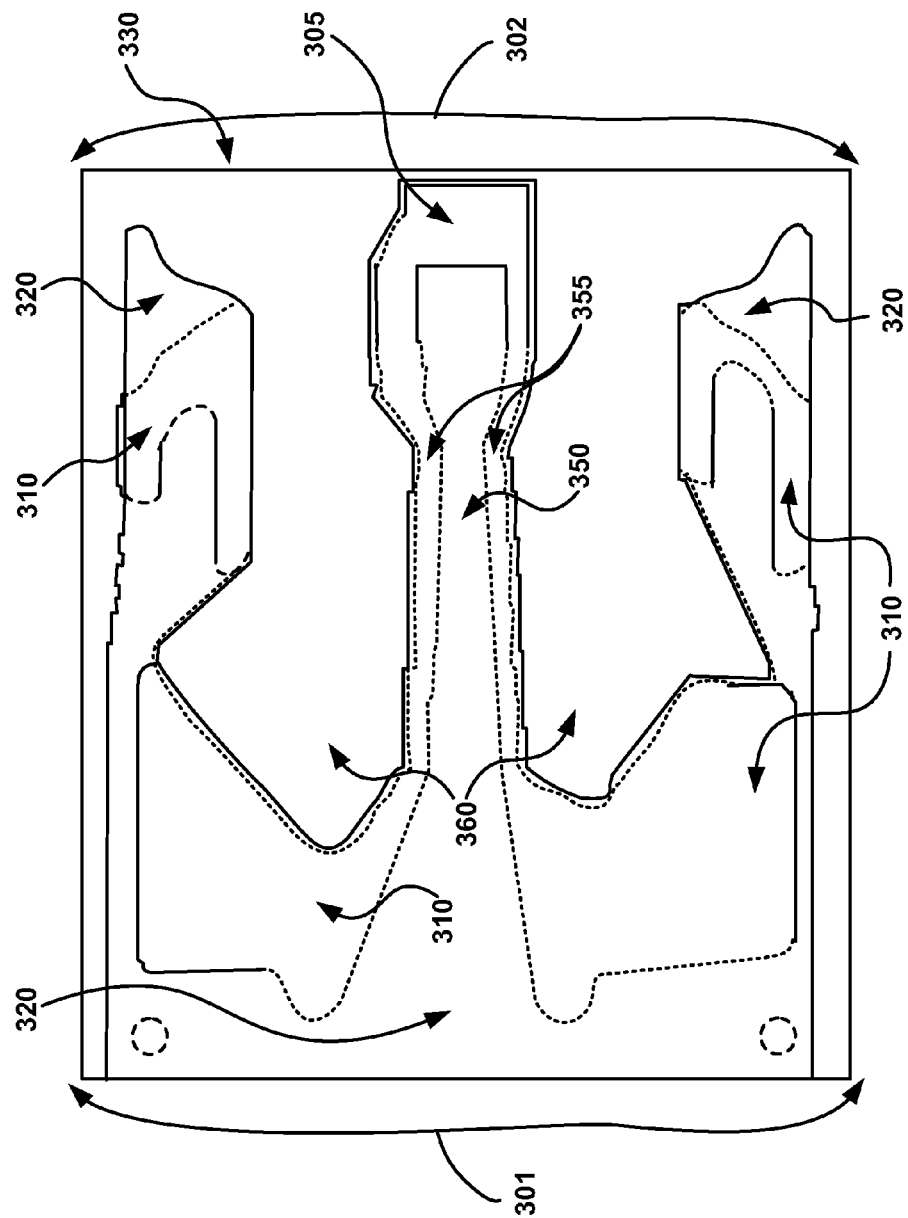
FIG. 3 is a top view of an air bearing surface of a slider, in accordance with one embodiment of the present invention.

With reference now to FIG. 3, an air bearing surface (ABS) of a slider is shown, in accordance with one embodiment of the present invention. ABS 300, in this embodiment, is created via a known two-etch process, using a combination of ion mill etching and reactive ion etching. The surface of the ABS is etched down to a first depth, leaving behind only selected features, and the surface is hereinafter described as surface level 310. This first etching is 0.12 micrometers deep. The first depth is then further etched, leaving behind only selected features, and the first depth is hereinafter described as middle level 320. This second etching is 0.52 micrometers deep. The second depth, as a result, is 0.64 micrometers below surface level 310. This second depth is hereinafter described as bottom level 330. The number of etchings and the depth of each was selected for convenience, to conform to a process for 15 creating an already-existing slider. Other embodiments of the present invention use different numbers of etchings, and different depths for the etchings.

ABS 300, in this embodiment, has a leading edge (LE) 301, and a trailing edge (TE) 302. When incorporated into a hard drive or other data storage device, a transducer or other read element is mounted at TE 302, at point 305. ABS 300 also includes, in this embodiment, channel 350, which is bounded by two channel walls 355, which are part of surface level 310, and is created in the first etching pass. Other embodiments use multiple channels. Other embodiments use multiple etching passes to create a channel 350. ABS 300 also includes several negative pressure pockets 360, partially bounded by regions of surface level 310. Other embodiments include differing numbers of negative pressure pockets 360. Other embodiments partially bound negative pressure pocket 360 with regions of middle level 320.

For this invention, one important consideration was improving the air pressure at point 305. This is accomplished in this embodiment by the inclusion of a shallow channel 350, running from the leading edge back to near point 305. In operation, air passes over LE 301, and into channel 350. At this point, the pressure of the air is still near-ambient. In the depicted embodiment, the air is at a slightly higher pressure than ambient, as channel 350 narrows as it approaches point 305. In other embodiments, air pressure along channel 350 remains constant, or decreases slightly. An important feature of this invention is that the air pressure at point 305 be maximized; various configurations of channel 350, combined with different shapes for the rest of ABS 300, lead to different results.

In this embodiment, air from LE 301 also passes over surface level 310, and then into negative pressure pockets 360. The air is first compressed by passing over surface level 310, as less space is available between surface level 310 and the surface of the disk of the hard drive. The air then expands in negative pressure pockets 360, creating suction and attracting ABS 300 to the surface of the disk of the hard drive. This suction counteracts the repulsion caused by air at higher-than-ambient pressures, over other portions of ABS 300.

ABS 300, in one embodiment, is used with a center pivot point. In another embodiment, ABS 300 is used with a front pivot point. Other embodiments position the pivot point in other locations.

Traditional ABS designs lacked channel 350. Some traditional designs included a single large negative pressure pocket, spanning most of the ABS, and then used a multilevel step up to try to increase air pressure at the read/write element. Embodiments of ABS 300 compare very favorably to such traditional designs in most respects, and much better in others.

Figure 4:
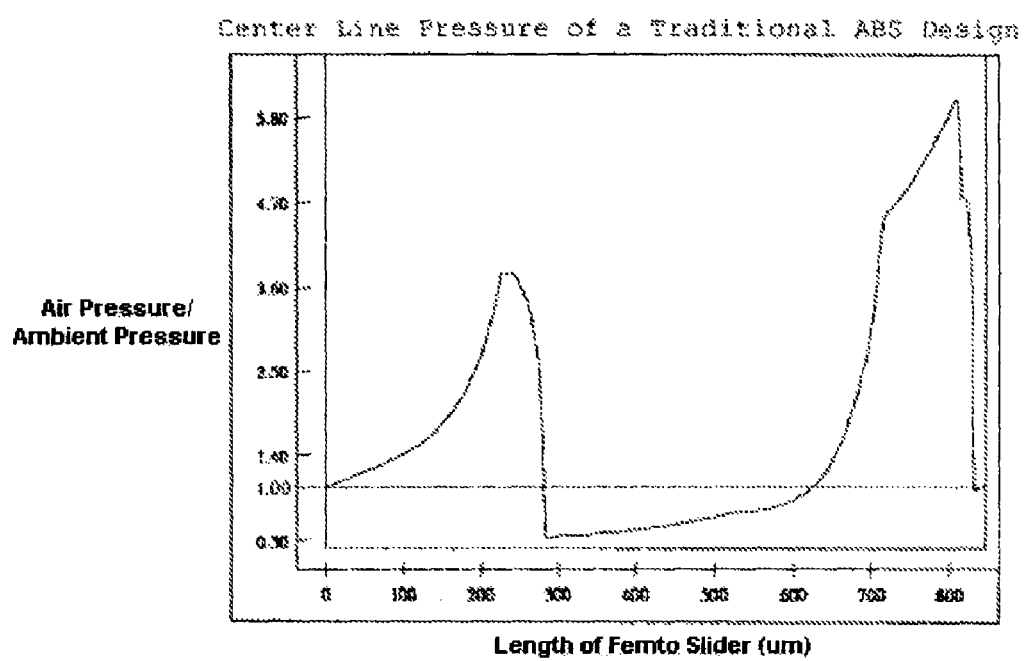
FIG. 4 is a depiction of a Center Line Pressure of a Traditional ABS Design.

FIG. 4 depicts air pressure relative to position along the center line of a traditional ABS design. The horizontal axis depicts the length of an exemplary femto slider, in micrometers; femto sliders are typically 850 micrometers long. The vertical axis depicts air pressure at a given point along the center line of the ABS, in terms of the ratio of air pressure at that point to ambient pressure. Air enters the traditional ABS at the leading edge, at ambient pressure (i.e. 1.0). As it passes over the leading edge, and reaches a portion of the ABS at a higher level, the air is compressed, and pressure increases. Air passes the higher level, and flows into a negative pressure pocket; the air pressure drops significantly below ambient levels (here, to approximately one third of the ambient pressure). The air then flows towards the trailing edge and the read/write element, and pressure increases again, until it reaches the highest peak at the read/write element.

Figure 5:
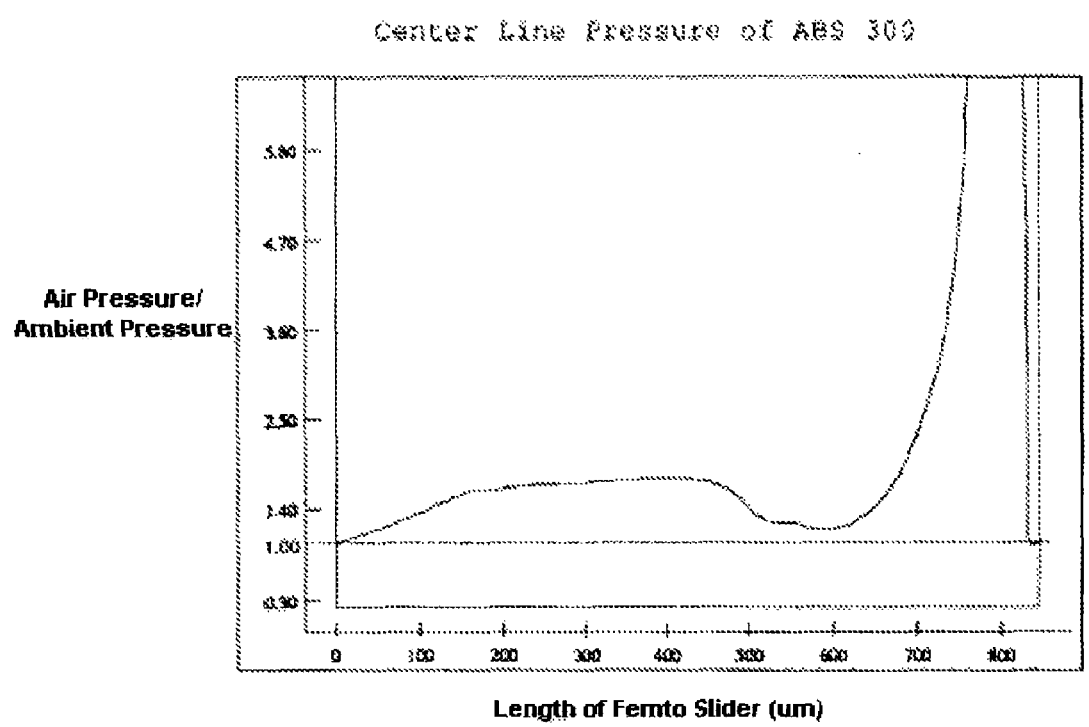
FIG. 5 is a depiction of a Center Line Pressure of ABS 300.

FIG. 5 below, depicts air pressure along the center line of one embodiment of the present invention, such as ABS 300. Again, the horizontal axis depicts the length of ABS 300, in micrometers, and the vertical axis depicts air pressure at a given point along the center line of the ABS, in terms of the ratio of air pressure at that point to ambient pressure.

Air enters ABS 300 at LE 301 at ambient pressure (1.00), and flows into channel 350. As the air flows along channel 350, it is compressed slightly as channel 350 narrows, then depressurizes slightly where channel 350 widens. The air pressure does not drop significantly below ambient pressure at any point along channel 350. When channel 350 ends, and the air flows up over surface level 310 towards point 305 and TE 302, the air pressure increases tremendously, and far more significantly than in the traditional design.

Figure 6:
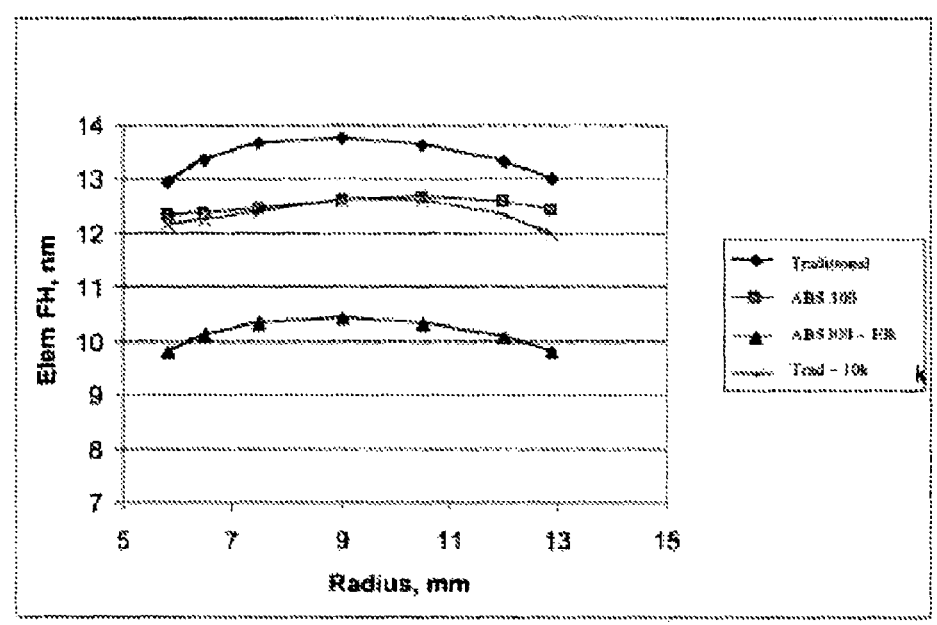
FIG. 6 is a depiction of Traditional ABS vs. ABS 300 at Higher Altitudes.

One benefit of the present invention is that, under conditions with lower ambient pressures (e.g. higher altitude), embodiments such as ABS 300 have a higher fly height. FIG. 6 shows the fly heights of a traditional ABS design and ABS 300, relative to their position on the radius of a hard drive disk, both at sea level and at 10,000 feet. ABS 300 has nearly identical performance at both altitudes, while the traditional design varies substantially depending on altitude.

Embodiments of the present invention described above thus relate to a personal portable storage device as well as a hard disk apparatus configured for use as a personal portable storage device. While the present invention has been described in particular exemplary embodiments, the present invention should not be construed as limited by such embodiments, but rather construed according to the following claims and their equivalents.

What is claimed is:

1. An air bearing surface (ABS) for a head assembly for a data storage device comprising:
   a member comprising a first extended region and a second extended region, wherein said first extended region and said second extended region define a channel, wherein said channel is open to a leading edge (LE) of said ABS, and wherein said channel is configured so as to allow air to flow along said channel toward a trailing edge (TE) of said ABS, such that a pressure of said air flowing along said channel does not fall significantly below an ambient pressure of the air, wherein said first extended region forms a surface level, wherein said surface level forms a plane nearest to a disk, wherein said surface level bounds said channel with two opposing channel walls and a channel wall near said TE wherein said first extended region of said member at least partially bounds a first low pressure area, wherein air that passes over said first extended region enters said first low pressure area, expands, and substantially depressurizes.

2. The ABS of claim 1, wherein said second extended region of said member at least partially bounds a second low pressure area, wherein air that passes over said second extended region enters said second low pressure area, expands, and substantially depressurizes.

3. The ABS of claim 2, wherein said channel and said first and second low pressure areas are created by a two etch process.

4. The ABS of claim 3, wherein said two etch process comprises reactive ion etching.

5. The ABS of claim 3, wherein said two etch process comprises ion mill etching.

6. A data recording device comprising:
   a disk with a data surface of concentric data tracks;
   a rotator for rotating said disk about an axis generally perpendicular to the disk;
   a slider maintained in operative relationship with the data surface when the disk is rotating, said slider having an air bearing surface (ABS), said ABS having a member comprising a first extended region and a second extended region, wherein said first extended region and said second extended region define a channel, wherein said channel is open to a leading edge (LE) of said ABS, and wherein said channel is configured so as to allow air to flow along said channel toward a trailing edge (TE) of said ABS, such that a pressure of said air flowing along said channel does not fall significantly below an ambient pressure of the air;
   a transducer attached to said slider for reading data from and writing data to the data surface;
   an actuator for moving said slider generally radially to the disk to allow the transducer to access the data tracks; and
   an electronics module for processing data read from and written to the data surface,
   wherein said first extended region forms a surface level, wherein said surface level forms a plane nearest to a disk, wherein said surface level bounds said channel with two opposing channel walls and a channel wall near said TE and wherein said first extended region of said member of said slider at least partially bounds a first low pressure area, wherein air that passes over said first extended region enters said first low pressure area, expands, and substantially depressurizes.

7. The data recording device of claim 6, wherein said slider is configured for a center pivot point.

8. The data recording device of claim 6, wherein said slider is configured for a front pivot point.

9. The data recording device of claim 6, wherein said second extended region of said member of said slider at least partially bounds a second low pressure area, wherein air that passes over said second extended region enters said second low pressure area, expands, and substantially depressurizes.

10. The data recording device of claim 9, wherein said channel and said first and second low pressure areas of said slider are created by a two etch process.

11. The data recording device of claim 10, wherein said two etch process comprises reactive ion etching.

12. The data recording device of claim 11, wherein said two etch process comprises ion mill etching.

13. An air bearing surface (ABS) for a head assembly for a data storage device comprising:
    means for defining a channel, wherein said channel is open to a leading edge (LE) of said ABS, and wherein said channel is configured so as to allow air to flow along said channel toward a trailing edge (TE) of said ABS, such that a pressure of said air flowing along said channel does not fall significantly below an ambient pressure of the air, wherein a surface level forms a plane nearest to a disk, wherein said surface level bounds said channel with two opposing channel walls and a channel wall near said TE; and
    means for defining a low pressure area, wherein air that enters said low pressure area, expands, and substantially depressurizes.

* * * * *